United States Patent [19]

Suzuki

[11] Patent Number: 5,787,312
[45] Date of Patent: Jul. 28, 1998

[54] DATA STORAGE DEVICE FOR DISPLAYING STICKING OR STOCKING MEMORANDUM DATA TO RECORDED DATA ALONG WITH A SYMBOL INDICATIVE OF A PRESENCE OF THE MEMORANDUM DATA

[75] Inventor: Katsumi Suzuki, Fussa, Japan

[73] Assignee: Casio Computer Co., Ltd., Tokyo, Japan

[21] Appl. No.: 531,734

[22] Filed: Sep. 21, 1995

[30] Foreign Application Priority Data

Sep. 28, 1994 [JP] Japan ................... 6-233554

[51] Int. Cl.⁶ .................................................. G06F 3/14
[52] U.S. Cl. ..................... 395/894; 707/526; 707/530; 707/541; 364/705.06
[58] Field of Search ..................... 345/179, 435; 364/709.11, 705.06; 455/556; 386/44; 707/3, 526, 530, 541; 395/894

[56] References Cited

U.S. PATENT DOCUMENTS

| 4,715,010 | 12/1987 | Inoue et al. ............... 364/705.06 |
| 4,730,186 | 3/1988 | Koga et al. ............... 345/179 |
| 4,769,796 | 9/1988 | Levine ............... 368/29 |
| 5,202,844 | 4/1993 | Kamio et al. ............... 364/709.11 |
| 5,337,346 | 8/1994 | Uchikura ............... 455/556 |
| 5,523,942 | 6/1996 | Tyler et al. ............... 386/44 |
| 5,557,794 | 9/1996 | Matsunaga et al. ............... 707/3 |
| 5,568,599 | 10/1996 | Yoshino et al. ............... 345/435 |

*Primary Examiner*—Thomas C. Lee
*Assistant Examiner*—David Ton
*Attorney, Agent, or Firm*—Frishauf, Holtz, Goodman, Langer & Chick

[57] ABSTRACT

A data storage device includes a memory for storing fixed-form data such as schedule data and a memory for storing handwriting memory data. When a particular key is operated when a schedule is displayed, a memorandum input screen is opened on the display. The user is able to input memorandum data by handwriting on the input screen or read-out and display already stored memorandum data on the input screen. By operating a key displayed on the input screen, the written or read-out memory data can be stuck as a memorandum to the displayed schedule or its date.

10 Claims, 10 Drawing Sheets

FIG.2

SCHEDULE DATA AREA (SA) — MEMO DATA NO. AREA

| SCHEDULE DATA AREA (SA) | MEMO DATA NO. AREA |
|---|---|
| DEC. 9, 1994 | |
| 10:00~12:00  PROJECT MEETING | |
| DEC. 10, 1994 | |
| SCHEDULE DATA 1 | 02 |
| SCHEDULE DATA 2 | |
| SCHEDULE DATA 3 | 05 |
| DEC. 11, 1994 | |
| SCHEDULE DATA 4 | 01 |
| SCHEDULE DATA 5 | |
| SCHEDULE DATA 6 | 03 |
| SCHEDULE DATA 7 | |
| SCHEDULE DATA 8 | |
| DEC. 12, 1994 | 01 |
| SCHEDULE DATA 9 | |
| | |

MEMO DATA AREA (MA) — MEMO NO.

| MEMO DATA AREA (MA) | MEMO NO. |
|---|---|
| MEMORANDUM 1 | 01 |
| MEMORANDUM 2 | 02 |
| MEMORANDUM 3 | 03 |
| MEMORANDUM 4 | 04 |
| MEMORANDUM 5 (PHONE FOR Mr.YAMAMOTO) | 05 |

DATA STORAGE DEVICE FOR DISPLAYING STICKING OR STOCKING MEMORANDUM DATA TO RECORDED DATA ALONG WITH A SYMBOL INDICATIVE OF A PRESENCE OF THE MEMORANDUM DATA

BACKGROUND OF THE INVENTION

1. Field of the Invention

The present invention relates to data storage such as in electronic notebooks which store and manage data, for example, relating to an individual's schedule.

2. Description of the Related Art

An individual's schedule data which is managed in an information storage device such as an electronic notebook typically includes fixed items such as dates, time, content and places of the schedules with the respective items of data being input and stored in combinations of numerals and characters.

When memorandum data is desired to be added, stored and managed in schedule data including a plurality of such fixed items in the conventional electronic notebooks, the memorandum data is required to be added and recorded in the existing items of the schedule content or otherwise required to be input and stored independently into newly provided memorandum columns.

Thus, when the same memorandum data is desired to be added to a plurality of schedule data in such conventional electronic notebooks, it is required to be stored as schedule content in each of the schedule data or otherwise the same memorandum data is required to be input and stored in each of the memorandum columns. In other words, addition of considerable memorandum data is not easy when a schedule is displayed.

The above described conventional technique for handling memorandum data for schedule data also applies to telephone number and address data managed by an electronic notebook. In both cases, memorandum data can not be easily added, disadvantageously.

SUMMARY OF THE INVENTION

It is therefore an object of the present invention to provide a data storage which is capable of attaching or otherwise deleting memorandum data to and from fixed-form data such as schedule data.

In order to achieve the above object, according to the present invention, there is provided a data managing device comprising:

a first memory for storing a plurality of first data;

a second memory for storing a plurality of second data;

input designation means for designating an input mode for the second data when the first data is displayed;

input screen creation means for displaying an input screen for the second data when the input mode is designated by the designation means;

input control means for inputting and editing the second data on the input screen; and second control means for relating the second data to the first data displayed on the input screen.

In another aspect, according to the present invention, there is provided a data storage device comprising:

a first memory for storing first data, a second memory for storing memorandum data, a display for displaying data, and a controller for sticking memorandum data to the first data and peeling the stuck memorandum data from the first data, the controller operating:

to display on said display an input screen where the memorandum data is inputtable during the display of the first data;

to store the memorandum data input through the input screen into the second memory, to store relation data between the first data and the memorandum data to stick the memorandum data, to display a mark indicative of the presence of any related memorandum data, if any, in the display of the first data, and to erase the relation data when the memorandum data read from the second memory is pelt.

BRIEF DESCRIPTION OF THE DRAWINGS

FIG. 2 shows the respective constructions of a schedule data area SA of a RAM and a memorandum data area of a memorandum data RAM in the electronic notebook;

FIGS. 7A and 7B show a display state of a liquid crystal display appearing in the memorandum key process and the first memorandum process, performed in the electronic notebook, wherein FIG. 7A shows an input wait state of a memorandum input display screen G2, and FIG. 7B shows a recorded memorandum display state of the memorandum input display screen G2;

FIGS. 8A and 8B show a display state of a liquid crystal display appearing in the memorandum key process performed in the electronic notebook, wherein FIG. 8A shows a handwriting input state of the memorandum input display screen G2, and FIG. 8B shows a stuck memorandum data state on the schedule display screen G1;

DESCRIPTION OF THE PREFERRED EMBODIMENTS

Whole Circuit Construction

Figure 1:
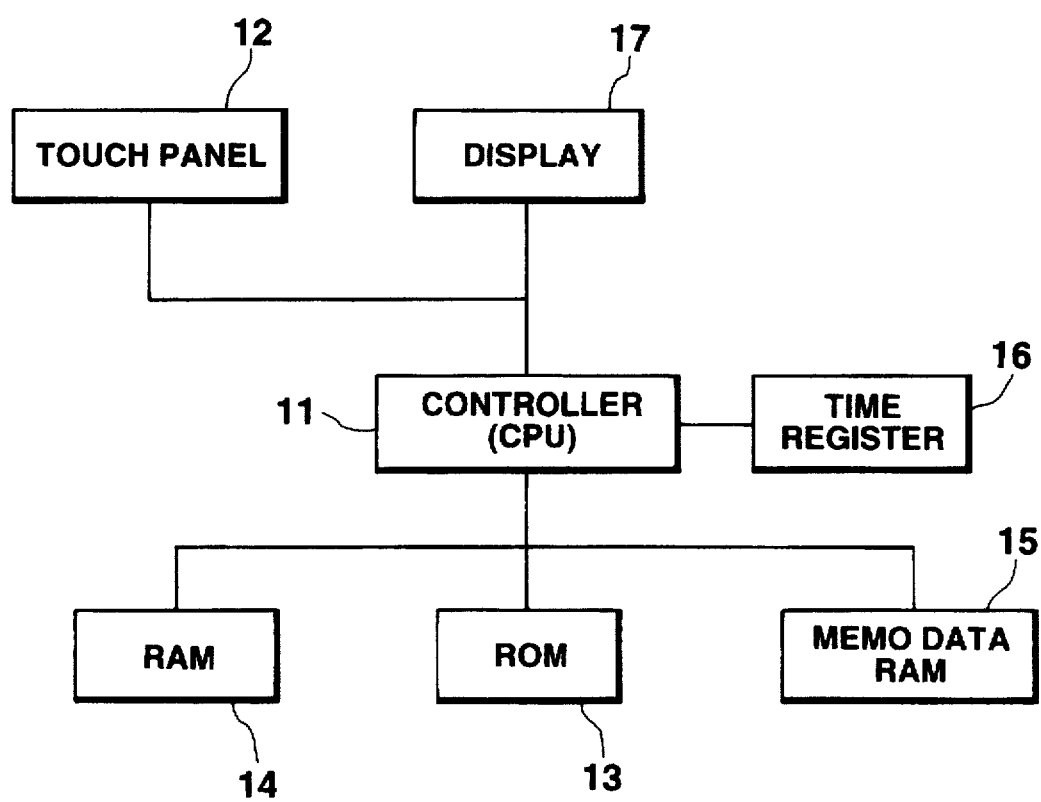
FIG. 1 is a block diagram indicative of the construction of an electronic circuit of an electronic notebook to which the present invention is applied.

FIG. 1 is a block diagram indicative of an electronic circuit construction of an electronic notebook to which the present invention is applied.

The electronic notebook has a controller (CPU) 11 which has the function of storing and managing data on schedules, telephone numbers and an address book. The CPU 11 starts up a system program contained beforehand in a ROM 13 in accordance with an input operation signal from a touch panel 12 to control the respective operations of the circuit elements concerned. The CPU 11 is connected to the touch panel 12, ROM 13, a RAM 14, a memorandum RAM 15, a time register 16, and a liquid crystal display 17.

The touch panel 12 has a transparent input area corresponding to the display area of the display 17 and superposed on the display 17 screen. When the touch panel 12 is touched thereon at any point, for example, with a pen, a voltage signal corresponding to the touched position is output to the CPU 11.

Thus, the CPU 11 detects the coordinates of the touched position on the display 17 on the basis of the voltage signal fed from the touch panel 12 and determines the content of the process on the basis of the content of the display at that time.

The ROM 13 contains a system program which controls the whole operation of the electronic notebook, and other various application programs for schedule management and the telephone book. It also contains a memorandum key process program which includes sticking memorandum data to display data.

Each of the respective programs contains data display screen (schedule display screen, etc.,) data, memorandum data input screen data, and memorandum data display screen data.

The ROM 13 also contains data on font patterns of all characters, numerals and symbol characters to be displayed on the display 17.

The RAM 14 has a work area which temporarily stores data input/output in accordance with various operation modes set by the CPU 11 as required. It also includes a schedule data area, telephone number data area, address data area, etc., for storing data depending on the functions of the electronic notebook.

In this case, the individual data stored in the schedule data area of the RAM 14 includes date, time, content and place data.

The memorandum data RAM 15 has a memorandum data area which stores and holds as image data memorandum data processed or input by handwriting.

FIG. 2 shows the respective constructions of a schedule data area SA provided in the RAM 14 of the electronic notebook and a memorandum data area MA provided in the memorandum data RAM 15.

The schedule data area SA stores individual schedule data arranged in order of date and time data with the date data also serving as a boundary one for grouping purposes. The storage areas for the respective date data and schedule data have corresponding memorandum number areas NA which store memorandum numbers indicative of which memorandum data in the memorandum data area MA are stuck to the corresponding memorandum areas. For example, FIG. 2 shows that memorandum data on a memorandum number "01" is related to one schedule on Dec. 11, 1994 and the date "Dec. 12".

The memorandum numbers in the memorandum data area MA are determined in order of recording of the memorandum data.

The time register 16 sequentially updates and sets date, time, weekday data on the basis of a crystal oscillation signal having a predetermined cycle. Retrieving and reporting processes for schedule data stored in the schedule data area SA of the RAM 14 are performed on the basis of the time data in the time register 16.

The display 17 displays, for example, a schedule display screen, a memorandum input display screen, or a memorandum display screen selectively in accordance with a corresponding operational mode.

Operation of the Electronic Notebook

The schedule data display process performed in the electronic notebook will be described with reference to a flow chart of FIG. 3.

Figure 3:
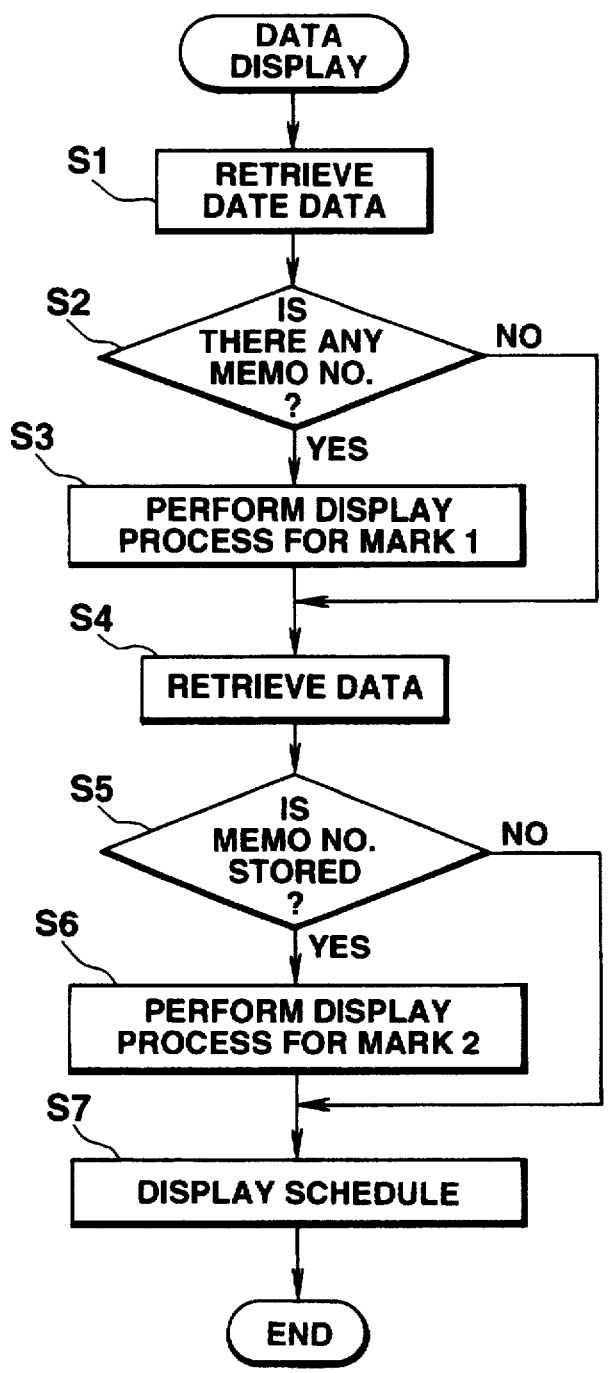
FIG. 3 is a flow chart indicative of a schedule data display process performed by the electronic notebook.

When the user selects a schedule data display menu by touching a schedule display menu on the initial menu display screen (not shown), the schedule data display process of FIG. 3 is executed.

In this process, the CPU 11 first retrieves and reads the current date data (for example, on Dec. 9, 1994) from the schedule data area SA of RAM 14 in accordance with data on the current date which is recorded by the time register 16 (step S1).

The CPU 11 then determines whether any memorandum number has been stored in the memorandum number area NA of the schedule data area SA corresponding to the retrieved date data or memorandum data is stuck to the appropriate date (step S2). If so, the CPU 11 performs a memorandum mark Mm1 display process for a date memorandum mark display 21a of the schedule display screen G1 displayed on the display 17 (steps S2, S3).

When the data has the content of FIG. 2, no memorandum data is stuck to date data on Dec. 9, 1994. Thus, no memorandum mark Mm1 display process is performed.

Subsequently, the CPU 11 retrieves and reads schedule data (on the time "10:00–12:00"/content "Project meeting"/place "Meeting room A") stored in the schedule data area SA in correspondence to the retrieved date data "Dec. 9, 1994" (step S4).

The CPU 11 then determines whether any memorandum number has been stored in the memorandum number area NA of the schedule data area SA corresponding to the retrieved schedule data, that is, whether memorandum data has been stuck to the appropriate schedule data (step S5). If so, the CPU 11 performs a memorandum mark Mm2 display process for the data memorandum mark display 21b of the schedule display screen G1 displayed on the display 17 (steps S5, S6).

In the case of the data of FIG. 2, since no memorandum data has been stuck to the schedule data, no memorandum mark Mm2 display process is performed.

Figure 4:
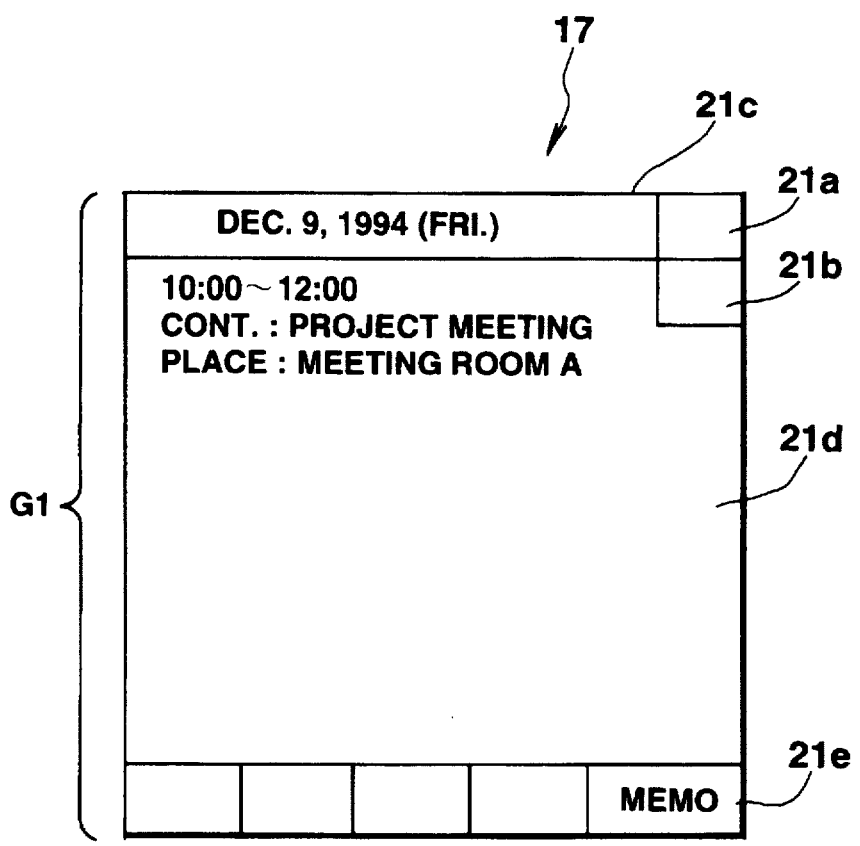
FIG. 4 is a display state of a schedule display screen G1 appearing in the schedule data display process.

Thus, the CPU 11 displays on the schedule display screen G1 the date data "Dec. 9, 1994" and the schedule data which the CPU 11 has retrieved and read, as shown in FIG. 4 (step S7).

In this case, a "memorandum" key 21e, which is operated when memorandum data is stuck to the displayed schedule data, is displayed in the right-hand end portion of the key display area along a lower edge of the display 17.

Memorandum Recording/Sticking

Figure 5:
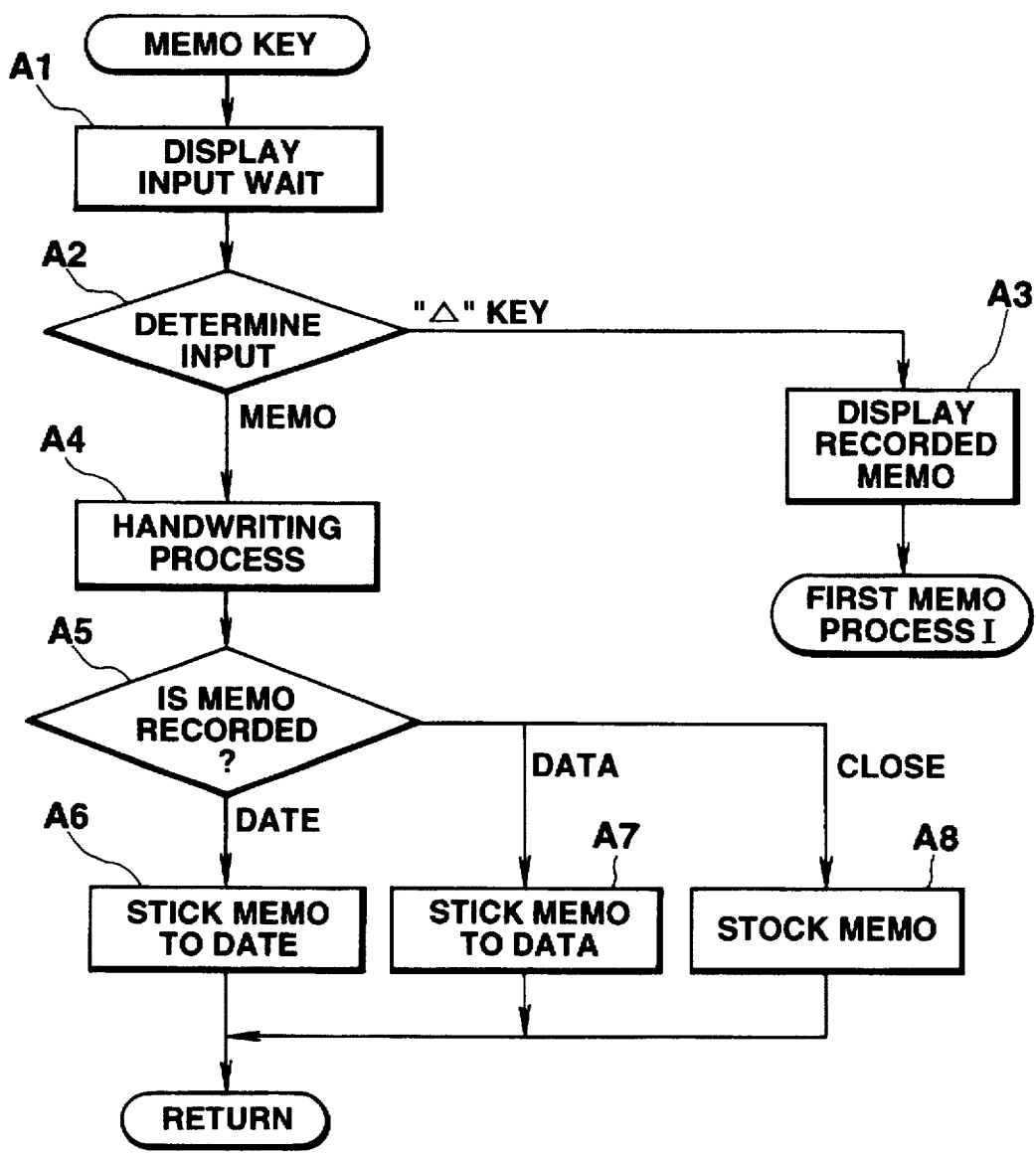
FIG. 5 is a flow chart indicative of a memorandum key process performed by the electronic notebook.

FIG. 5 is a flow chart indicative of a memorandum sticking process in the electronic notebook. As shown in FIG. 4, in order to stick a memorandum to the displayed date or schedule in a state where the schedule display screen G1 has been displayed on the display 17, the "memorandum" key 21e is required to be touched, which displays a memorandum input display screen G2 on the schedule display screen G1 to thereby result in an input memorandum data wait state, as shown in FIG. 7A (step A1).

The memorandum input screen G2 has a handwriting input area 22a and displays various keys above and below the handwriting input area 22a. A pen key 22b sets a handwriting mode, and an eraser key 22c sets an erasure mode. A record number area 22d displays a memorandum number in the memorandum data area MA (FIG. 2) where the memorandum data written and read in the handwriting input area 22a is stored and recorded. Keys "△" 22e and "▽" 22f are used to change memorandum data read and displayed in the handwriting input area 22a. A "close" key 22g is used to close the display screen for the memorandum data.

A "stick to date" key 22h displayed below the handwriting input area 22a is used to stick memorandum data written or read and displayed in the handwriting input area 22a to the date data displayed on the schedule display screen G1. A "stick to data" key 22i is used to stick the displayed memorandum data to the schedule data.

Figure 7A:
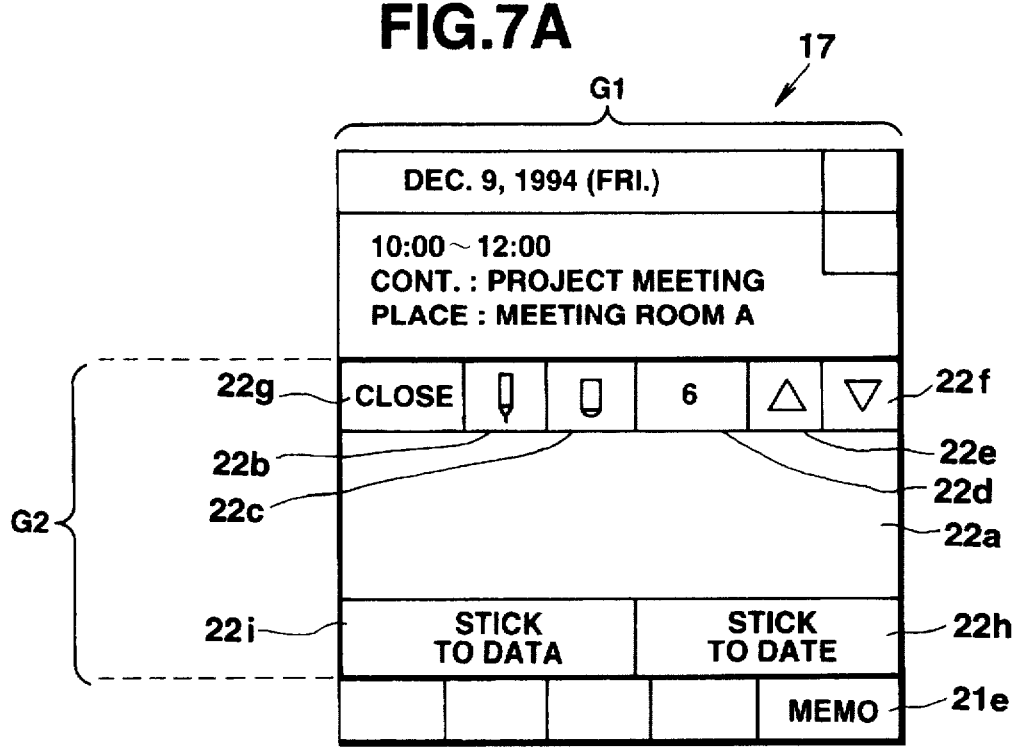
Figure 7B:
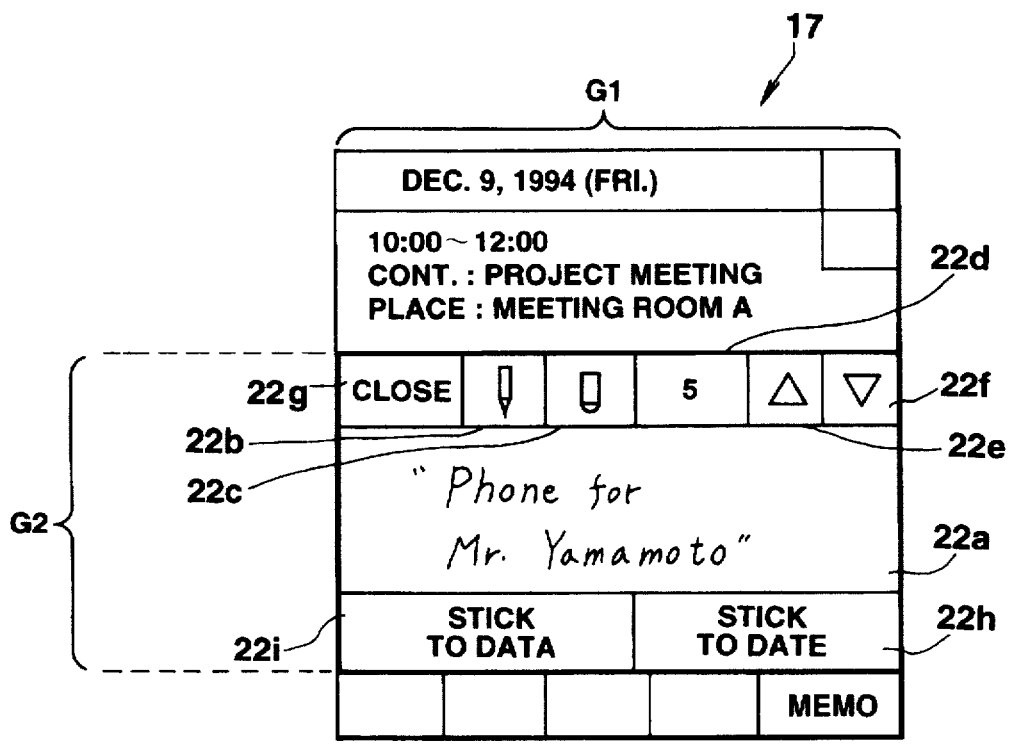

When the key "△" 22e is operated in the memorandum input wait state of FIG. 7A, the memorandum data recorded already in the memorandum data area MA is called. For example, when the number return key "△" 22e is operated once, a memorandum number "5" corresponding to the memorandum data recorded last in the memorandum data MA (FIG. 2) is displayed on the record number area 22d and the recorded memorandum data "Phone for Mr. Yamamoto" is displayed on the handwriting input area 22a, as shown in FIG. 7B (steps A2, A3).

Figure 6:
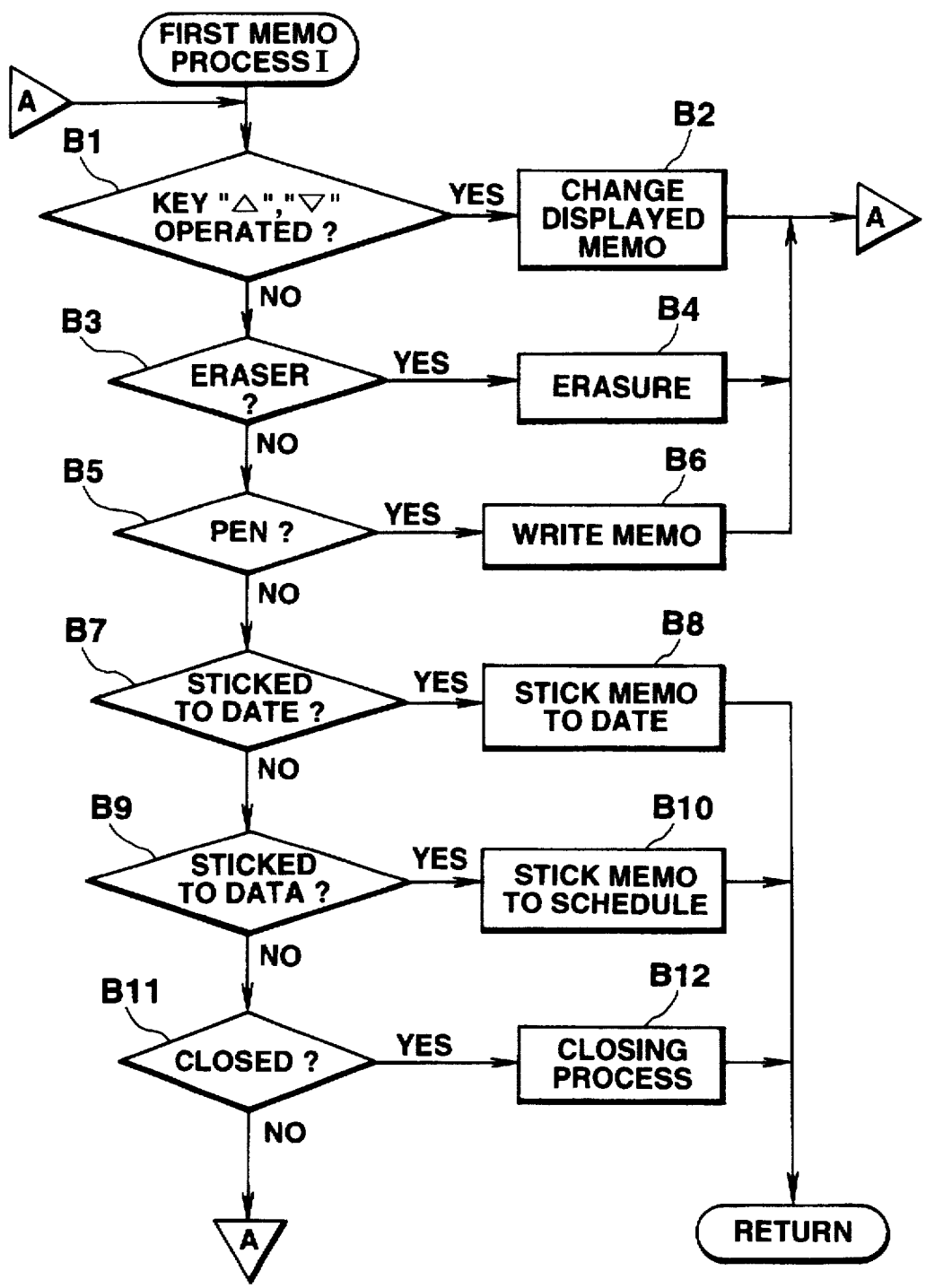
FIG. 6 is a flow chart indicative of a first memorandum process performed by the electronic notebook.

Thus, control passes to a first memorandum process I of FIG. 6. In this process, each time the number return "△" key 22e or the number advance "▽" key 22f is operated, a different memorandum number is selected and memorandum data corresponding to the selected memorandum number is read from the memorandum data area MA and displayed in the handwriting input area 22a (steps B1, B2).

This implies that when the memorandum key is operated to call the memorandum mode, memorandum data is readable and processable irrespective of display of the original schedule.

In a state where the desired memorandum data recorded in the memorandum data area MA has been called and displayed in the handwriting input area 22a by the operation of the number return or advance "△" or "▽" key 22e or 22f, the user can edit the displayed memorandum data. When the user touche s the eraser key 22c and then that portion of the memorandum data displayed on the handwriting input area 22a and desired to be erased, that data portion at the touched position is erased (steps B3, B4).

When the pen key 22b is touched to write something in the handwriting input area 22a, memorandum data corresponding to the trace of the handwriting is written and displayed additionally (steps B5, B6).

When the "stick to date" key 22h is operated for the recorded data read in steps B1, B2 or for the data which has been subjected to handwriting in steps B3–B6, the appropriate memorandum data is stuck to the date data displayed on the schedule display screen G1. More specifically, the memorandum number is set in the memorandum number area NA of the schedule data area SA in correspondence to the date "Dec. 9, 1994". That is, the stick-to-date process has been performed (steps B7, B8).

When the "stick to data" key 22i is operated, the memorandum number "5" where the memorandum data is recorded is set in the memorandum number area NA of the schedule data area SA in correspondence to the schedule data displayed on the schedule display screen G1. That is, the memorandum data sticking process for sticking the display memorandum data to the schedule data is performed (steps B9, B10).

When the "close" key 22g is operated in the state where the memorandum data sticking process has been performed or not, the memorandum input screen G2 is closed and the original display screen is restored.

Figure 8A:
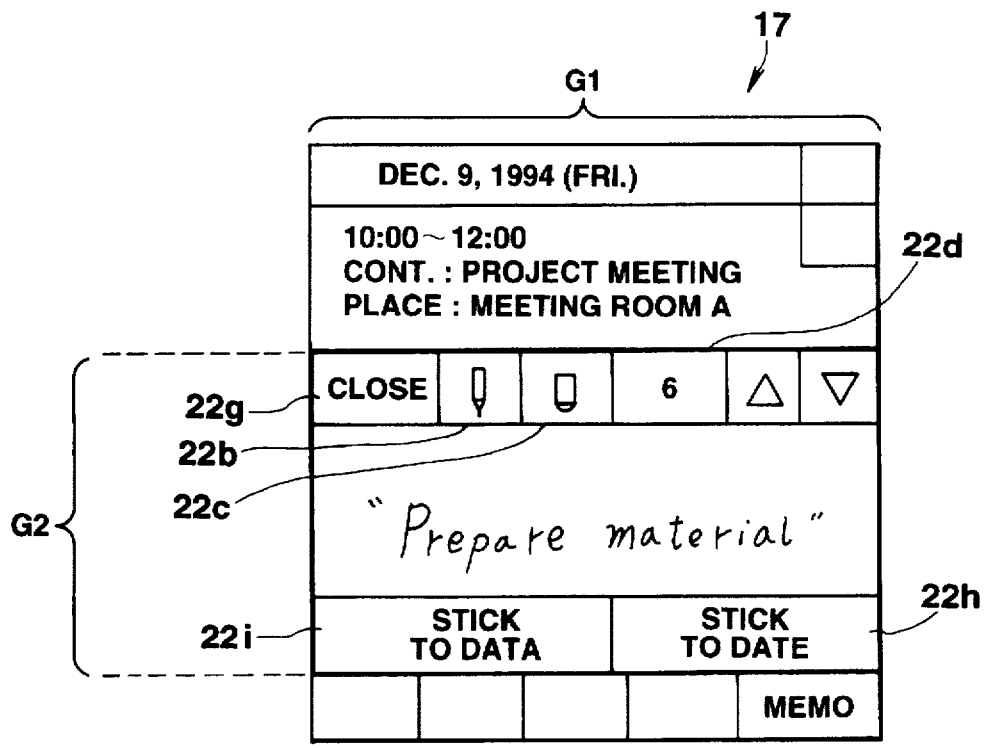

In the memorandum data input wait state of FIG. 7A in step A1 of the memorandum sticking process of FIG. 5, the user can input "Prepare material" as desired memorandum data by handwriting in the handwriting input area 22a of the memorandum input display screen G2, as shown in FIG. 8A (steps A2, A4).

When the "stick to date" key 22h is then operated, the memorandum data is stored as a memorandum No. 6 in the memorandum data RAM and the memorandum No. "6" which indicates the location where the memorandum data is recorded is set in the memorandum number area NA of the schedule data area SA in correspondence to the date data "Dec. 9, 1994" displayed on the schedule display screen G1 (steps A5, A6).

As shown in FIG. 8A, when desired memorandum data "Prepare material" is input by handwriting in the handwriting input area 22a of the memorandum input display screen G2 and the "stick to data" key 22i is operated, the memorandum number "6" which indicates the location where the memorandum data is recorded is set in the memorandum number area NA of the schedule data area SA in correspondence to the schedule data (time "10:00–12:00"/content "Project meeting"/place "Meeting room A") displayed on the schedule display screen G1 (steps A2, A4; A5, A7).

Figure 8B:
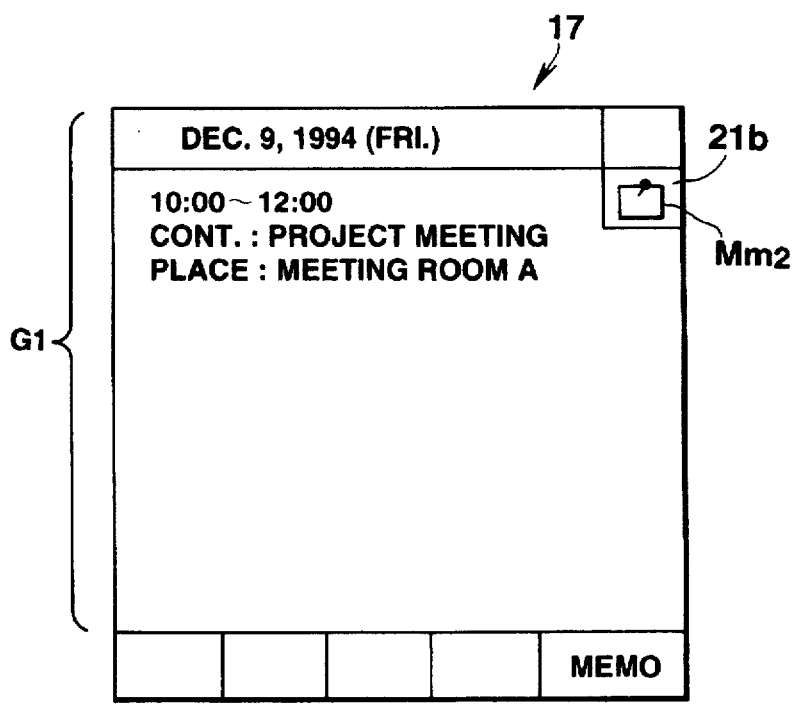
Figure 9:
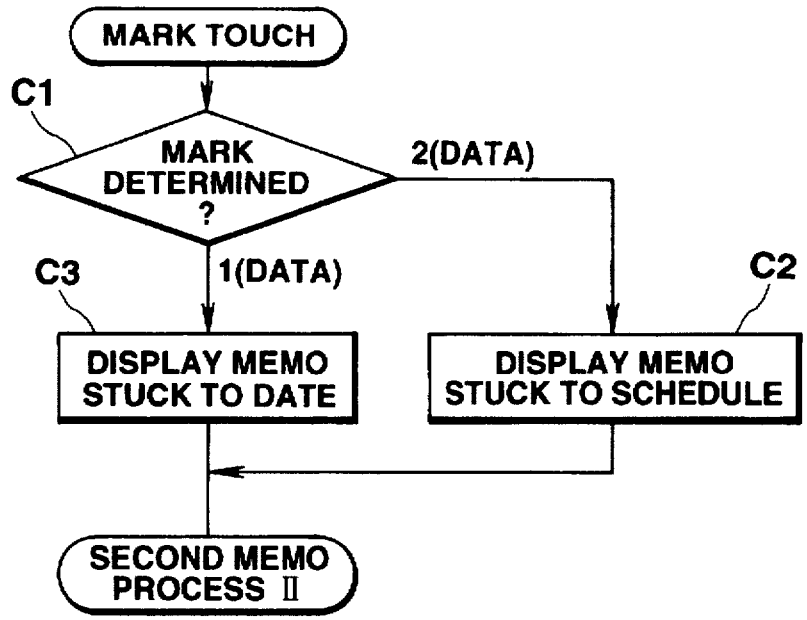
FIG. 9 is a flow chart indicative of a memorandum mark touching process in the electronic notebook.

When the "close" key 22g is then operated in such state, the memorandum input display screen G2 is closed and the original display screen is restored. When the memorandum data has been stuck, as shown in FIG. 8B, the memorandum mark Mm2 is displayed on the data memorandum mark display 21b of the schedule display screen G1. That is, the display screen indicates that there is a memorandum for schedule data (steps A5, A8).

In summary, when the memorandum key 21e is operated to call a memorandum mode in a state where the desired schedule is displayed on the schedule display screen G1, desired already recorded memorandum data is called selectively or otherwise new memorandum data is input by handwriting and displayed on the memorandum input display screen G2. When the "stick to date" key 22h is operated, the memorandum data is stuck to data on the date of the displayed schedule. When the "stick to data" key 22i is operated, the memorandum data is stuck to the displayed schedule data. Thus, desired memorandum data is created easily and stuck selectively to all the schedules.

Display of the Memorandum Data

When the schedule is displayed (in accordance with the flow chart of FIG. 3) in a state where the memorandum data is stuck to the schedule data starting with December 9, 10:00, a schedule display screen G1 with a memorandum mark Mm2 in the data memorandum mark display 21b appears, as shown in FIG. 8B. When the mark Mm2 is touched to view the memorandum data stuck to the schedule data, the memorandum number (in this case, "6") set in the memorandum number area NA of the schedule data area SA in correspondence to the schedule data is retrieved, the memorandum data (in this case, "Prepare material") corresponding to the memorandum number "6" is read from the memorandum data area MA and displayed in the handwriting input area 22a of the memorandum display screen G3, as shown in FIG. 11 (steps C1, C2).

When the memorandum mark Mm1 is displayed in the date memorandum mark display 21b of the schedule display screen G1 and touched to view the memorandum data stuck to the date data corresponding to the mark Mm1, the memorandum number set in the memorandum number area NA of the schedule data area SA in correspondence to the date data is retrieved. As a result, memorandum data corresponding to the memorandum number is read from the memorandum data area MA so as to be displayed in the handwriting input area 22a of the memorandum display screen G3 (steps C1, C3).

As just described above, when schedule data is displayed on the schedule display screen G1 and a memorandum is stuck to the schedule or the date, a mark indicative of that fact is displayed. In order to confirm the content of the memorandum, the memorandum mark Mm1 or Mm2 is required to be touched to thereby display easily the memorandum data stuck to the date data or schedule data.

Figure 10:
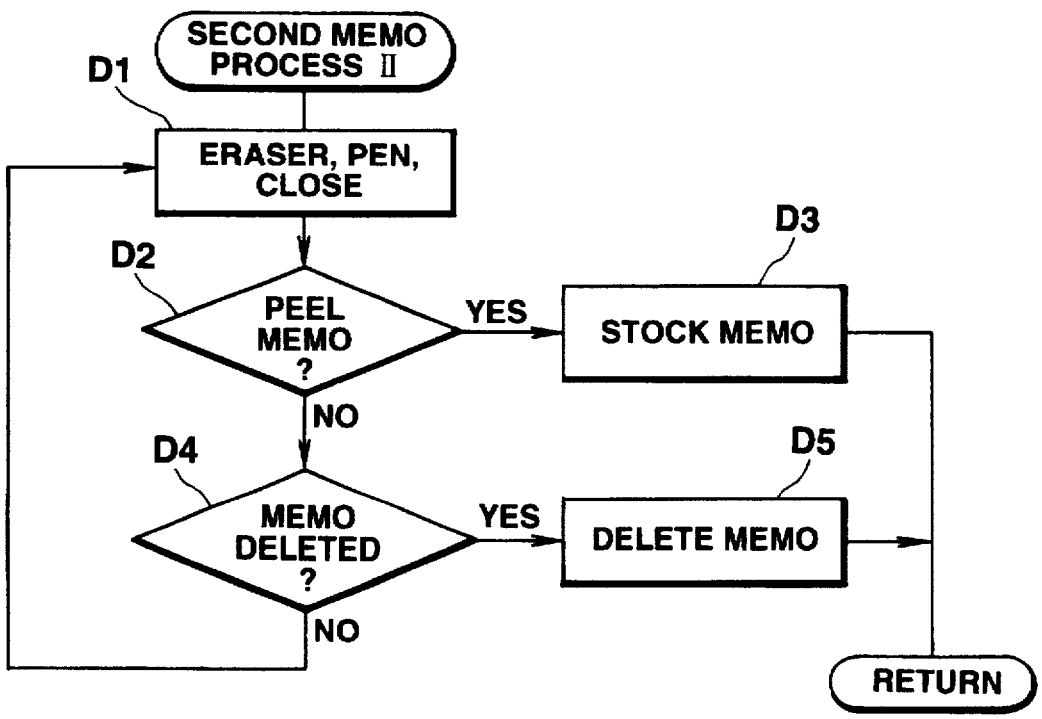
FIG. 10 is a flow chart indicative of a second memorandum process in the electronic notebook.
Figure 11:
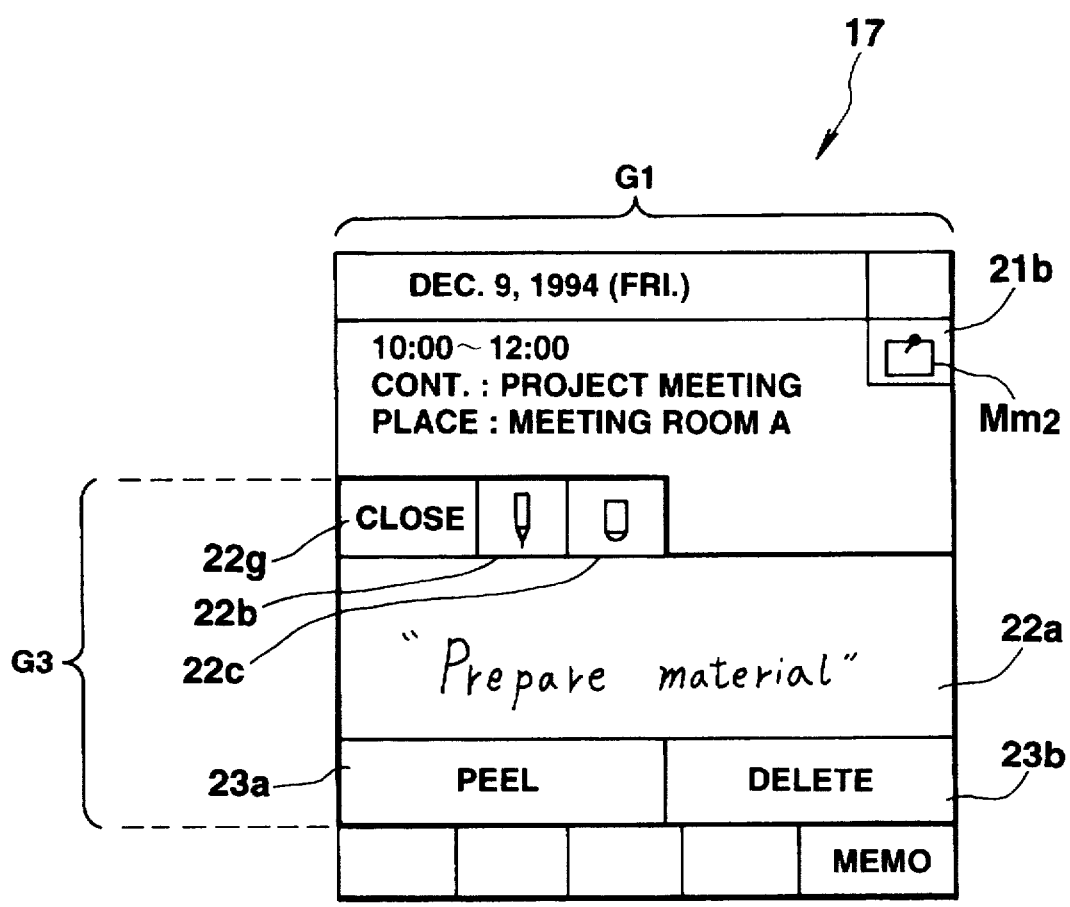
FIG. 11 shows a display state of a memorandum stuck to schedule data on a memorandum display screen G3 appearing in the memorandum mark touching process and the second memorandum process performed in the electronic notebook.

In the state where the memorandum data stuck to the schedule data is displayed as shown in FIG. 11 after the steps C1 and C2 involved in the memorandum mark touching process, control passes to a second memorandum process of FIG. 10. When the pen key 22b or the eraser key 22c is touched to perform a handwriting operation on the handwriting input area 22a, the memorandum data displayed in the handwriting input area 22a in accordance with the handwriting operation is added, erased and processed as required, as in the processing performed in steps B3–B6 of the first memorandum process (step D1).

When the "close" key 22g is operated, the memorandum display screen G3 is closed and returns to its original display screen as in steps B11 and B12 of the first memorandum process. In this case, the memorandum data edited in the handwriting input area 22a is updated and recorded as a memorandum number "6" in the memorandum data area MA (step D1).

Deletion of Memorandum Data

As shown in FIG. 11, when the sticking of the memorandum data "Prepare material" is dissolved in a state where the memorandum data stuck to the schedule data has been displayed, the user touches a "peel" key 23a provided in a lower area of the memorandum display screen G3. This clears the memorandum number "6" set in the memorandum number area NA of the schedule data area SA in correspondence to the displayed schedule data to thereby dissolve the sticking of the memorandum data. In addition, the memorandum mark Mm2 displayed in the data memorandum mark display 21b is erased. When the sticking relationship is canceled, the memorandum data "Prepare material" is kept in the memorandum data area MA corresponding with the memorandum number "6" (steps D2, D3). Thus, this memorandum data can again be stuck to other schedule data later.

As shown in FIG. 11, when the sticking of the displayed memorandum data "Prepare material" itself is desired to be deleted in a state where the memorandum data stuck to the schedule data has been displayed, the user operates the "delete" key 23b provided in the lower area of the memorandum display screen G3. This clears the memorandum number "6" set in the memorandum number area NA of the schedule data area SA in correspondence to the displayed schedule data to thereby delete the memorandum data "Prepare material" from the memorandum data area MA and erase the memorandum mark Mm2 displayed in the data memorandum mark display 21b (steps D4, D5).

Thus, the memorandum data stuck to the date data or schedule data in the schedule display screen G1 can be easily called and displayed on the memorandum display screen G3, and the operations of appropriately processing and again recording the memorandum data, canceling the sticking of the memorandum data to the date or schedule data, and erasing the recording of the memorandum data itself can be performed easily.

What is claimed is:

1. A data storage device which includes a memory for storing data and a display for displaying data read out from the memory as requested by a user, said data storage device comprising:

input screen displaying means for displaying, on a display screen on which data has been displayed, an input display screen through which memorandum data is inputted;

first sticking means for sticking to the displayed data the memorandum data inputted through the input display screen;

stocking means for stocking the memorandum data inputted through the input display screen without the memorandum data being stuck to the displayed data;

stocked data displaying means for reading the memorandum data stocked by said stocking means and for displaying the read memorandum data;

second sticking means for sticking to the displayed data the memorandum data displayed by said stocked data displaying means;

symbol displaying means for displaying the data to which the memorandum data is stuck by one of said first and second sticking means, along with a symbol indicative of a presence of the memorandum; and memorandum data displaying means responsive to an operation of the displayed symbol for displaying the memorandum data stuck to the data.

2. The data storage device according to claim 1, further comprising means for selecting data to be stuck from among a plurality of stocked memorandum data.

3. The data storage device according to claim 1, wherein said input display screen comprises means for commanding one of sticking and stocking of the inputted memorandum data.

4. The data storage device according to claim 1, wherein:

said memorandum data displaying means comprises means for displaying a memorandum data output display screen, said memorandum data output display screen comprising means for commanding a separation of the memorandum data displayed on said memorandum data output display screen; and said data storage device further comprising means responsive to the separation of the memorandum data for stocking the separated memorandum data.

5. The data storage device according to claim 1, further comprising tablet input means for covering said input display means, and wherein the memorandum data comprises handwritten data inputted through said tablet input means.

6. The data storage device according to claim 1, wherein the data stored in the memory comprises schedule data, and said sticking means comprises means for selecting one of a data and an event of the schedule data and means for sticking the selected one of the data and the event of the schedule data to the memorandum data.

7. A data storage device comprising:
   first memory means for storing first data;
   second memory means for storing memorandum data;
   display means for displaying data; and
   control means for one of sticking the memorandum data to the first data and separating the memorandum data from the first data;

wherein said control means comprises:

means for displaying on said display means an input display screen through which the memorandum data is inputtable while the first data is being displayed, said input display screen comprising means for enabling a user to issue one of a stick command for commanding sticking of the input memorandum data to the first data and a stock command for stocking of the input memorandum data without sticking the input memorandum data to the first data;

means responsive to the stick command for storing the memorandum data in said second memory means and for relating the first data to the memorandum data so as to stick the memorandum data to the first data, and responsive to the stock command for storing the memorandum data in said second memory means without relating the first data to the memorandum data;

means for displaying the first data to which the memorandum data is stuck, along with a symbol indicating that the memorandum data is stuck to the first data;

means responsive to an operation of the displayed symbol by the user for reading from said second memory means the memorandum data stuck to the first data and for displaying the read memorandum data; and means responsive to a separation command for releasing the first data from the memorandum data stuck thereto.

8. The data storage device according to claim 7, wherein said control means comprises means for displaying a memorandum data output display screen on which the memorandum data stuck to the first data is displayed, said memorandum data output display screen comprising means for enabling the user to issue the separation command for releasing the first data from the displayed memorandum data stuck thereto, and means responsive to the release of the first data for storing the displayed memorandum data.

9. The data storage device according to claim 8, wherein said control means comprises means for reading the stocked memorandum data from said second memory means and for displaying the read memorandum data, and means responsive to the stick command for relating the displayed memorandum data to the displayed first data so as to stick the displayed memorandum data to the displayed first data.

10. The data storage device according to claim 9, further comprising a tablet input means for covering said display means, and wherein the memorandum data comprises handwritten data inputted through said tablet input means.

* * * * *